Nov. 11, 1958  T. D. BOWES  2,860,297
ANGULAR MOTION CONTROLLER FOR A MOTOR
Filed Oct. 2, 1953  2 Sheets-Sheet 1
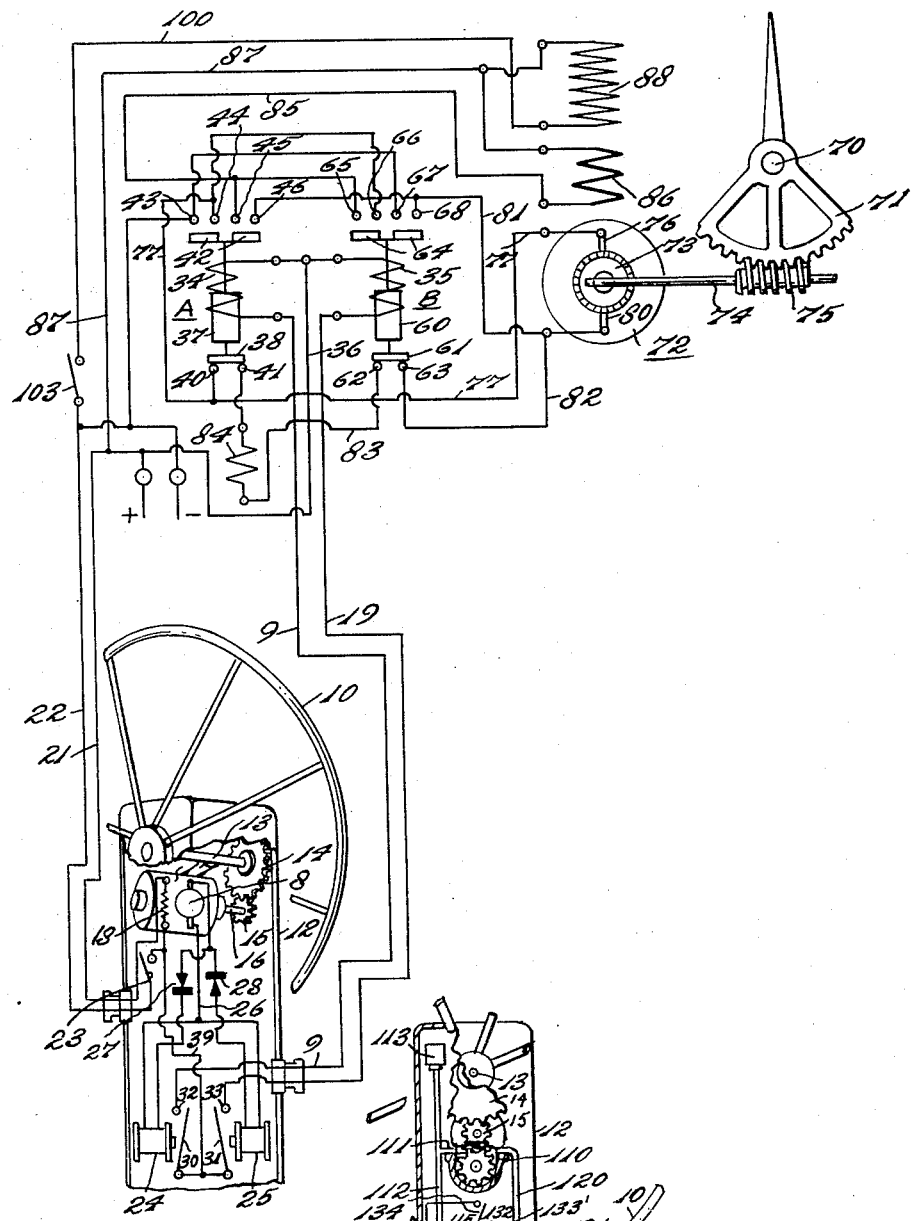
INVENTOR
Thomas D. Bowes
BY
Frank H. Borden
ATTORNEY

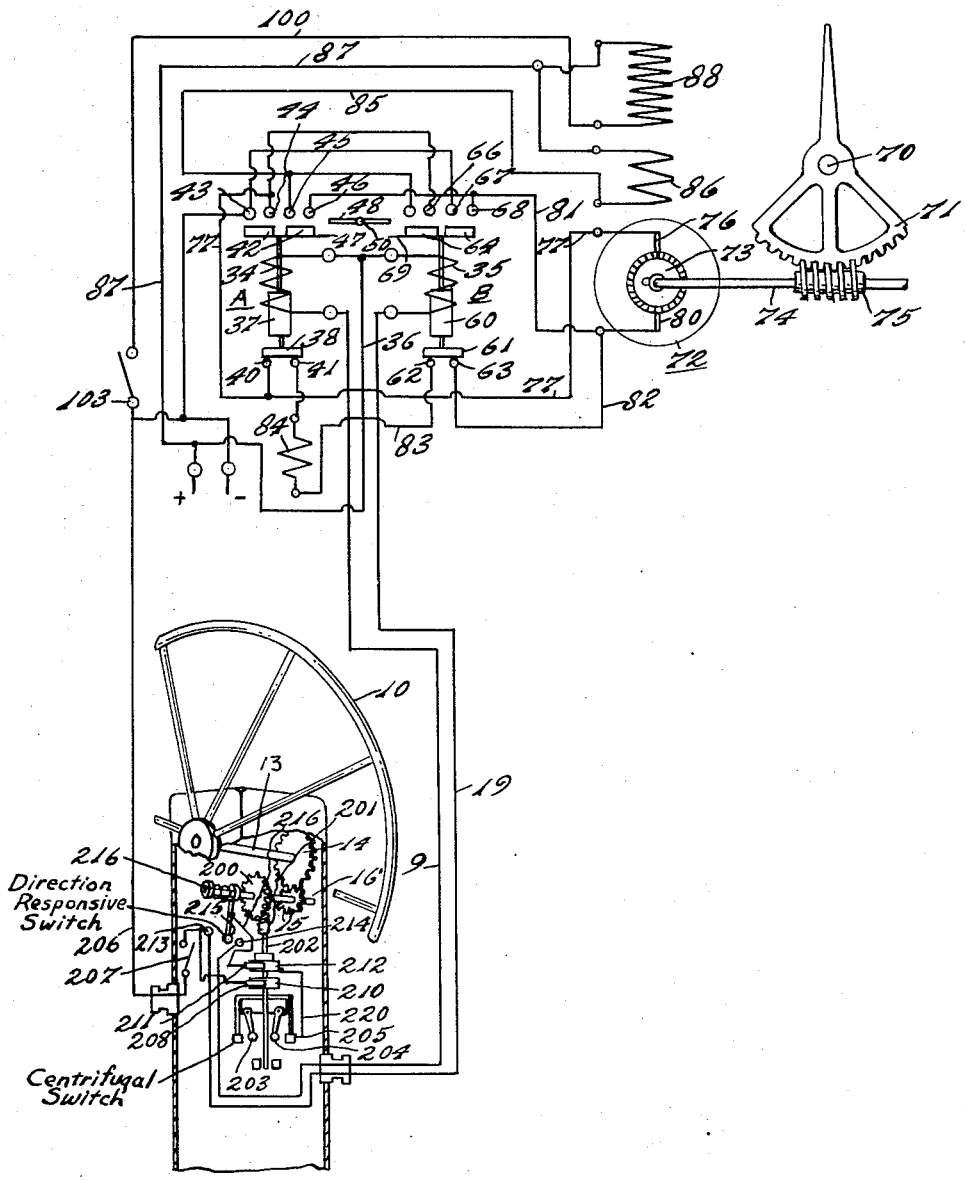

United States Patent Office 2,860,297
Patented Nov. 11, 1958

2,860,297
ANGULAR MOTION CONTROLLER FOR A MOTOR

Thomas D. Bowes, Bala-Cynwyd, Pa.

Application October 2, 1953, Serial No. 383,867

8 Claims. (Cl. 318—293)

This invention relates to angular motion controllers, and particularly to angular receiver-motion responsive as a function of time of running of a transmitter in angular motion.

The invention is directed primarily to the provision of a transmitter, comprising means movable in widely variable degrees of angular motion in either direction having a time function between starting and stopping, a circuit including a reversible motor, and relays operated in accordance with the sense of angular motion of the transmitter actuating the motor in a related sense for substantially the duration of the time interval between starting and stopping of the transmitter. While the invention is obviously of wide scope of useful application, as, for instance, in the transmission of signals from the bridge for controlling a ship power plant, a useful field lies in the steering control of a ship or vessel, and it will be described in this connection as an illustrative embodiment.

It is among the objects of the invention to provide a simple and inexpensive control of receiver angular motion functionally with a transmitter angular motion; to provide an improved and simplified circuit for controlling a motor effecting desired angular motion in response to relay actuation established and maintained during angular motion of a transmitter; to provide a reversible motor of any desired power and torque output controlled by signals, which may be relatively weak, established and maintained functionally with the running or movement of a transmitter in angular motion; to provide a steering control with remotely spaced rudder, having a simple electrical cable connection between them of any desired length; to provide a ship steering electrical organization of simple and rugged electrical elements without thermionic elements; and to provide other advantages and objects as will become more apparent as the description proceeds.

In the accompanying drawings forming part of this description:

Fig. 1 represents a schematic diagram of the system of the invention, showing a steering wheel transmitter, the motor-driven rudder stock to be actuated as a function of the time of rotation of the steering wheel, and the electrical circuitry between the components, as the only connections therebetween.

Figs. 2 and 3 represent respectively fragmentary schematic diagrams of modified forms of steering wheel transmitter elements.

As noted, the transmitter element is preferably one that moves in angular motion for more or less varying periods of time of each such movement. As will appear, any device capable of closing a switch and holding it closed for varying lengths of time, in the broadest sense may comprise the transmitter. Thus, a simple lever for manual operation having a mid-position from which it is movable in either direction for alternatively closing opposite switches may be introduced into the circuit for effecting timed motor operation. However, this is so at variance with the practice accepted by generations of helmsmen and other sea-farers that it is not presently acceptable in ship installations for steering a ship, so a steering wheel is usually provided. The problem becomes complicated by the fact that the transmitter, which in the illustrative case comprises, in Fig. 1, a ship steering wheel 10, has angular motion, and no ordinary fixed switches or relays can be disposed for actuation by such angular motion because of the almost infinite range of such motion. That is, a wheel motion may be through a few degrees, or it may exceed a complete rotation. It becomes necessary to provide means which upon the initiation of wheel motion of wheel 10 will instantly control a relay for the running of the receiver motor in the proper sense, will maintain the relay in its motor running energization so long as the given steering wheel continues to be turned, regardless of the time duration of such steering turning, but which will immediately deenergize the relay and stop the motor with cessation of turning of the given steering wheel.

Referring then to all figures, the wheel 10 is keyed to a shaft 13, journalled in a support 12. In each illustrative figure the shaft 13 is coupled, through a gear train, with driven means to be described. Representative of any desired sort of gear train are the gears 14 and 15 common to all figures. In Fig. 1 the gear 15 drives a shaft 16 mounting the rotor element 8, of a small D. C. generator 17, having a field winding 18. The field winding 18 may be excited by a source of D. C., illustratively the D. C. power supply of the ship or vessel, through lead 21 connected to one side of the D. C. power supply, and through switch 23 and connector 22 to the other side of the D. C. power supply, or it may otherwise be self-excited, or may be comprised of permanent magnets. Relays 24 and 25 are usually provided, although it will be evident that with reasonably powerful output from generator 17, the relays 24 and 25 may be omitted and the power relays A and B, to be described, may be directly actuated from generator 17. The coils of relays 24 and 25 have a common connection 26 to one side of the output of generator 17. The other side of the output of the generator is split to pass through respectively oppositely polarized rectifiers 27 and 28 to the respective opposite ends of the coils of relays 24 and 25. The relays have spring pressed or biased switch elements, respectively 30 for relay 24, and 31 for relay 25, having a common connection 39 joined to one side of the D. C. power supply. Switch element 30 of relay 24 has a normally off or unmade contact 32, in circuit through line 9 with power relay A, and switch element 31 of relay 25 has a normally off or unmade contact 33, in circuit through line 19, with power relay B. The coils 34 and 35 of relays A and B have a common return 36 to the D. C. line connection 21. It will be clear that connections 21, 22, 9 and 19 may be incorporated in a single cable of any desired length extending between support 12, and the motor and rudder stock and power relay assembly to be described.

The coil 34 of relay A controls a core member 37, mounting a lower switch arm 38, normally closing and bridging contacts 40 and 41, when the coil 34 is not energized, and controlling the aligned upper bridging switch arms 42—42 for simultaneous engagement of two sets of two contacts, respectively 43 and 44, and 45 and 46, when coil 34 is energized. Coil 35 of relay B controls the movement of a core 60, the lower switch arm member 61 of which normaly bridges and closes contact with two contacts 62 and 63, in the deenergized condition of coil 35, and the aligned upper switch arms or bridging contact members 64—64 engage and close contact with two sets of two contacts, respectively 65 and 66, and 67 and 68.

A typical illustrative shaft, movable in angular motion at the receiver, may comprise a rudder stock 70, in driven relation to a reversible motor 72, so that running of the motor moves the shaft angularly. While any sort of motor can be used that seems most expedient for the particular installation, whether A. C. or D. C., for illustrative purposes the motor 72 is a D. C. shunt wound reversible motor. The driving connection between the shaft 74 of the motor and the controlled shaft 70 may be of any desired sort of gearing or transmission. For illustrative purposes a worm gear 75 on shaft 74 is in constant mesh with a sector gear 71 keyed to the rudder stock 70. Brush 76 of the motor, through connector 77, joins contact 40 of relay A with upper switch contact 44 of the latter. Connector 77 terminates in upper contact 66 of relay B. Brush 80 of motor 72, through connector 81, joins upper contact 68 of relay B with contact 46 of relay A, and through connector 82 is connected to lower contact 63 of relay B. Contact 62 of this latter relay connects through connector 83 and resistance 84 with contact 41 of relay A. Contact 65 of relay B, through connector 85, joins contact 45 of relay A and connects to one end of the series field winding 86 of the motor 72. The other end of this winding, through connector 87, runs to one side of the D. C. power line, and to one end of the shunt field winding 88. The other side of the shunt field winding through connector 100 connects to the other side of the D. C. line.

With line switch 103 closed, the shunt winding 88 is coupled to the D. C. power supply, with closing of switches 23 and with wheel 10 stationary, and obviously the controlled shaft 70 is in any given angular position which it has previously attained, which attained angular position at which motion stops may be designated as a set point as there is, of course, no output from the small generator 17 and power relays A and B are deenergized. All of the upper switches of both relays A and B are open, and both lower switches are closed or made, and by dynamic or other braking the motor 72 is anchored against motion, and anchors the controlled shaft 70 in the instantaneous set point thereof. The braking may be solenoid controlled mechanical braking, for instance.

At any rate, for illustration, assume the helmsman wants to change the attitude of the rudder in a given direction to secure a given steering reaction for the ship. A twist of the wheel 10 in the proper sense for such steering effects, through the gearing 14 and 15 spins the rotor of the generator 17 in the related sense, and sends a D. C. current of given polarity according to the sense of wheel rotation to the rectifiers 27 and 28 and across the properly polarized rectifier, transmitting the small voltage of the established polarity on either relay 24 or 25. Assume it is relay 24 which is energized. This pulls in the switch element 30 against its bias, energizing coil 34 of relay A, raising core 37, breaking the circuit between the lower contacts 40 and 41, and stopping the dynamic braking of the motor secured by short circuiting brushes 76 and 80 through resistance 84. Synchronously, the elevation of the core 37 brings line voltage from one side of the D. C. line across contacts 43 and 44, bridging contact 42, and through connector 77, to brush 76. At the same time, through connector 81, bridging contact 42, and bridged contacts 45 and 46 and connector 85, the field 86 is placed in series with brush 80, and motor 72 runs in the proper sense to move the shaft 70 angularly. This running of the motor will maintain as long as rotation of the wheel in the same direction maintains regardless of the rate of rotation, provided it is always faster than a minimum speed necessary to effect a relay-controlling output of generator 17. However, as soon as rotation stops, and the output of the generator 17 stops, the electromagnetic force is inadequate to hold switch 30 against the coil 24, and this switch opens, the relay A drops out, and the motor immediately stops, by reassertion of dynamic braking, and the field circuit through series winding 86 is broken. The attained angular set point position of shaft 70 will remain until the next turning of the wheel. It will be clear that if relay 25 is energized a similar reaction occurs with relay B, and the series field 86 will be placed in series with brush 76 of the motor to cause an opposite running of motor 72.

It will be apparent that many changes can be made in the system as outlined, without departing from the spirit of the invention. For instance, it will be clear that no wheel organization is necessary provided some means is provided for exerting the requisite torque on the small generator. This may be accomplished by the movement of any sort of member, such as a tiller, or the like. It will also be apparent that, as the essential is merely that so long as a rotation of the shaft of the wheel maintains of sufficient torque force, the follow-up by the receiver organization should also maintain. It will be understood that with adequate capacity in generator 17, the output thereof can be fed directly to power relays A and B. To reduce the torque requirements on wheel 10, however, it is preferred to utilize primary relays 24 and 25. It will be apparent that a manifestation of such movement does not need to be electrical. One illustrative modification of the invention marking a change in the transmitter is shown in Fig. 2.

In this form of the invention the wheel 10 driving shaft 13, through gearing, rotates in one sense or the other a gear pump or like hydraulic unit 110. As is well known of gear pumps, there are two points of positive and negative pressure, from which conduits may lead for useful work. With a unidirectional pump these are fixed in character, but with a reversible pump each point partakes of the specific nature it may have as a result of specific direction of actuation and rotation of the gears of the gear pump. Referring to Fig. 2, the reversible gear pump 110 has a conduit 111 communicating with an operating conduit 112, the upper end of which may lead into a sealed sump chamber 113, and the lower end of which leads into a compression chamber 114, formed in part by the diaphragm 115, in communication with a conduit 116, to be further described. Gear pump 110 has another and opposite conduit 120, which leads into a compression chamber 121, formed in part by a diaphragm 122, in communication with a conduit 123. The respective lower conduits 116 and 123 have a plurality of cross channels between them, and illustratively three cross channels, in communication with both conduits. A channel 124 is provided with an adjustable valve such as a needle valve 125, which permits equalization of pressures between conduits 116 and 123 at a controlled and variable rate. A channel 126 is provided between the conduits 116 and 123, in which a one-way relief valve 127 is provided, precluding flow in one sense and opening under slight elevation of pressure on the valve to permit flow in the other. As indicated by the arrow, valve 127 opens under predetermined excess pressure in pressure chamber 114 and conduit 116. Finally, transverse channel 128 is provided between the conduits, containing a one-way relief valve 130 to preclude flow in a direction opposite to the preclusion of valve 127. Assuming, for example, that the diaphragms of the pressure chambers move a desired degree, as will be explained, in response to an increase in pressure of 1 p. s. i., the valves 130 and 127 open to permit flow with a few ounces of pressure above said 1 p. s. i. Obviously, this is purely by way of example.

The diaphragm 115 of pressure element 114 has an extension in position to be engaged and actuated by the diaphragm to move the switch element 131 to close a circuit through a contact 132 with predetermined expansion of the diaphragm. Diaphragm 122 of pressure chamber 121 is juxtaposed to a switch formed of movable element 133, having an extension in position to be engaged and actuated by the diaphragm 122 with expansion of the diaphragm to close a circuit through a contact 133'.

In the operation of the modified form of the invention shown in Fig. 2, it will be understood that switches 131 and 133 are, in their circuit-controlling functions, identical with switches 30 and 31 in their functioning relative to their respective contacts 32 and 33. With stoppage of rotation of the wheel 10 of Fig. 2, in predetermined due course the pressures in diaphragm or pressure chambers 114 and 121 equalize, by reason of flow across adjustable bleed valve 125, in one way or the other.

Let it be assumed, therefore, that with everything in a state of rest and quietude, the helmsman turns the wheel 10, controlling the rate and direction of motion of the gear pump 110. Let it be assumed that pressure immediately builds up in pressure chamber 121, forcing diaphragm 122 outwardly and closing switch 133 on contact 133'. As soon as a predetermined minimum pressure exists on the right side of the system, adequate to close the switch 133, any excess pressure existing in the chamber is vented to the opposite side of the line through relief valve 130, to prevent damage to the diaphragm organization of chamber 122. Of course, it also bleeds across valve 125. The intake side of the gear pump takes in oil from chamber 114 and from the conduit 116. Continued turning of the wheel 10 continues to pump oil in a short-circuited flow to and through the pressure chamber 121, across relief valve 130, and also at a controlled rate across needle valve or the like 125, into conduit 116, pressure chamber 114 through conduit 112 back into the gear pump. As long as this preponderance of pressure maintains in chamber 121, switch 133 remains closed, and relay B controlled thereby remains energized to run the motor in the proper direction as to secure the desired change of angular setting of the shaft 70. When the helmsman stops the rotation of the wheel the excess pressure instantaneously in chamber 121 bleeds across needle valve 125, permitting the diaphragm 122 to resume its normal unstressed attitude and position, opening switch 133, dropping out relay B, and the motor circuits previously established, and stopping the motor through the dynamic braking provided.

Of course, with a reversed turning of the wheel so that the pressure output is incident on pressure chamber 114, the build-up of the desired minimum excess pressure moves the diaphragm 115 to close the switch 131 on contact 132, actuating the relay A, by-passing excess pressure across relief valve 127, as well as by bleeding across the needle valve 125. With stoppage of the rotation in either direction the excess pressure in one chamber bleeds into the other chamber and both switches are opened and stay opened until a subsequent steering movement of the wheel is effected. It will be seen that switches 131 and 133 are respectively in circuit through relays A and B by connectors 9a and 19a, similar to connectors 9 and 19 of Fig. 1, and switch contacts 132 and 133' connect through common switch 134 to line 21. In this case line 22 is omitted from the switches.

It will be seen that many additional modifications and changes can be effected herein without departing from the spirit of the invention, in connection with which attention is directed to Fig. 3. In this organization the wheel 10 through gearing 14 and 15 drives a shaft 16' mounting a bevel gear 200 in constant mesh with a complemental spur gear 201 on shaft 202 mounting two fly balls or fly weights respectively 203 and 204, of a fly ball governor. Closely encircling the balls, but out of contact therewith during the state of pendant rest of the balls, is a circuit member 205. Preferably the latter is mounted on shaft 202 to rotate with the fly balls, although, if desired, the contact member may be stationary and comprise an inner flexible member capable of flexing outwardly under centrifugal force of the fly balls. The connection 206 to one side of the D. C. line, equivalent to line 21 of Fig. 1, through a switch 207, supplies a brush 208 swept or rubbed by a ring 210 insulated from shaft 202, but in electrical connection with the fly ball mount and the fly balls 203 and 204. A brush 211 is provided bearing against rotary ring 212 insulated on shaft 202 from the fly balls and their pivotal support. A fixed contact 214 is provided connected to line 9 leading to relay A, and a fixed contact 213, spaced from contact 213, is provided connecting to line 19 leading to relay B. A movable contact 215 is mounted on a friction clutch device 216' on shaft 16', and is connected through a connector 216 with brush 211.

It will be seen that this form of the device incorporates two different circuit controllers in series. In operation, with switch 207 closed, movement of wheel 10 does two things. It moves the movable friction clutch driven contact member 215 angularly the small distance necessary to bring it into circuit-controlling engagement with either contact 213 or 214, depending upon the direction of rotation of the shaft 16'. When a contact is thus established, and let it be assumed it is against fixed contact 214, the frictional coefficient being very low, continued rotation of the wheel and thus of shaft 16' is against the very low drag of the friction clutch, but without forcing the contacts into more than mere abutting contact. This then closes a partial circuit, namely from power relay A, through line 9, contact 214, contact 215, connector 216 to brush 211, and from ring 212, through connector 220 to the contact-making ring 205. With a given or predetermined rate of rotation of the shaft 202, the fly balls are rotated and under centrifugal force fly out into more or less intimate abutting contact with the contact member 205, completing the circuit from the member 205 through fly balls 203 and 204 to the ring 210, and through brush 208 to the line 206 to the D. C. power supply. Therefore, relay A remains energized as long as the rotation rate is adequate to hold the fly balls against the contactor 205. It will be clear that after attainment of the minimal fly ball rotational speed sufficient to centrifugally close the circuit between fly balls 203 and 204 and the contact 205, the circuit is "on," and the duration of the established circuit is purely a function of the time of such rotation and is completely independent of the rate of rotation of the fly balls, so long as a minimum rotational fly ball speed is attained and maintained. In other words the fly ball organization is an "on-off" switch, functionally operative "on" as long as a minimum relative speed is attained and thereafter remaining "on" regardless of any additional speed of rotation or any fluctuations thereof above the minimum. It is thus responsive only to the time duration of the rotation. On the other hand when the rotation slows to below the minimum speed, or stops, the fly ball contact is broken and the switch is "off." When rotation of the wheel ceases, the fly balls drop into their pendent position, breaking contact with the contactor 205 and breaking the circuit through the relay A. At this juncture, of course, movable contact 215 remains engaged with fixed contact 214. If the next wheel movement is in the same direction, the circuit response will be a little quicker as the attainment of fly ball weight attitude of contact with contactor 205 is the only lag. On the other hand, if the wheel is reversed in direction, there will be a small lag in the response involving the time required for the friction clutch to carry movable contact 215 from engagement with fixed contact 214, across the gap or space between the contacts and into engagement with fixed contact 213, but this is so inappreciable as to be negligible. Closing of the contact between movable contact 215 and fixed contact 213, and fly ball outward or centrifugally forced movement against the contactor 205 will energize power relay B, as will be clear.

It will be understood that the invention has wide scope of applications, and the motion of the transmitter shaft may be an automatic function of some other mechanism, and need not be manual, when used for steering it is applicable to any sorts of vehicles, such as land vehicles, aircraft, and surface and sub-surface ships. It is useable, for instance, for plural engine room controls, for valve poistioning or sluice gate control, or the control of machinery, and the like.

It will be noted that the drive control effected by the system disclosed it not a true follow-up, in the sense that there is no feed-back between the receiver shaft and the transmitter shaft. It will also be observed that the receiver shaft response is not proportional to the degree of turning of the transmitter shaft, but is only as a function of the time of such transmitter shaft rotation.

The simplicity, absence of fragile tubes, and related electronic elements, and the ruggedness and freedom from service worries of the system will be evident. It will also be evident that many variations of the system can be effected by those skilled in the art without departing from the spirit and the principles of the invention, and such are to be construed as within the scope of the invention, unless otherwise excluded by reason of specific limitations in the appended claims.

Having thus described my invention, I claim:

1. In combination, a reversible electric motor, circuit means including connections for a power source and the circuit controlling portions of a first and second relay for respectively controlling the running of said motor in one direction or the other at a substantially constant speed after starting and for stopping the motor, means comprising a centrifugal switch movable in angular motion, circuit means between said last means and said first and second relays selectively controlling the latter in accordance with the direction of angular motion and a minimum speed thereof and for holding a selected relay in actuated condition maintained directly proportionally to the duration of angular motion above a minimum speed thereof, control means positioned by said motor in accordance with the running and stopping of the latter.

2. In combination, a reversible electric motor, circuit means including a power circuit portion and a control circuit portion, and connections for a power source therefor, a first and a second relay each having coils in said coil circuit portion and switches in the power circuit portion for respectively energizing the motor for running in one direction or the other and for stopping the motor, centrifugal switch means in the control circuit portion, a switch in the circuit line to the centrifugal switch means and operable when suitably moved to energize said control circuit portion across said centrifugal switch means and to the coil of a selected relay, angularly movable means for synchronously moving said switch to select a relay in accordance with the direction of angular movement of said angularly movable means and for actuating a control circuit through the coil of the selected relay maintained as a function of the duration only of closing of said centrifugal switch means and independent of the variations in velocity of angular movement of said angularly movable means above that minimum necessary to actuate said centrifugal switch means, and control means positioned by said motor in accordance with the running and stopping thereof.

3. In controllers, an angularly movable control wheel susceptible to manual rotation, circuit means including angularly movable control means in driven relation to said control wheel for angular motion therewith, a pair of circuit controllers, and means responsive to the sense and duration only of rotation of said control wheel for actuating and holding in actuated condition a selected one of said pair of circuit controllers during the positive rotation of said control wheel, and for de-actuating said selected one of said circuit controllers when positive rotation of said control wheel stops.

4. In controllers, an angularly movable control wheel susceptible to manual rotation, circuit means including angularly movable control means in driven relation to said control wheel for angular motion therewith and a pair fo circuit controllers, said circuit means being responsive to the sense and duration only of rotation of said control wheel for actuating and holding in actuated condition a selected one of said pair of circuit controllers during the positive rotation of said control wheel, and for de-activating said selected one of said circuit controllers when positive rotation of said control wheel stops, comprising at fly ball governor, a pair of fixed contacts, a movable contact, a friction clutch, means driven by said control wheel in a sense related to the sense of rotation of said wheel in engagement with said friction clutch to move said movable element and also to rotate the fly ball governor, and circuit means completing a circuit partially established by engagement by said movable contact with one of said fixed contacts, in response to centrifugally effective fly ball movement.

5. A control system for angularly positioning a receiver as a time function of the angular motion of a transmitter, comprising an angularly movable transmitter control centrifugal switch element, a receiver comprising a reversible electric motor and a device positioned by the running of said motor on a range of positions, said device having stationary set points at any position on said range it happens to have attained when the motor stops after having run, said device movable from any set point on the range in one direction with running of said motor in its one direction and positioned at a new set point when the motor stops and movable from any set point on the range in the other direction with running of said motor in its other direction and positioned at a new set point when the motor stops, connecting means for a generally stable source of current for powering the motor, circuit means connecting said element, said connecting means and said motor and responsive to motion of said element in one direction for supplying said motor to run it in one direction at a constant rate regardless of the instantaneous set point of said device and regardless of the rate of movement of said element above a minimum rate and responsive to motion of said element in the other direction for supplying said motor to run it in the other direction at a constant rate regardless of the instantaneous set point of said device and regardless of the rate of movement of said element above a minimum rate, said motor and means responsive to cessation of the movement of said element to stop the motor to establish an instantaneous set point for said device on its range retained until a succeeding element movement.

6. A controller as in claim 3, in which the means responsive comprises a generator the output of which is across a pair of oppositely polarized rectifiers and controls the respective circuit controllers.

7. A controller as in claim 3, in which the means responsive comprises a D. C. generator, a pair of relays respectively controlling the respective circuit controllers, and connections from the generator to the respective relays including respectively oppositely polarized rectifiers.

8. A controller as in claim 3, in which the means responsive comprises a hydraulic pump, a pair of relays respectively controlling the respective circuit controllers, and pressure responsive units in the output of said pump respectively controlling the actuation of said respective relays.

References Cited in the file of this patent

UNITED STATES PATENTS

| Number | Name | Date |
|---|---|---|
| 697,826 | Fiske | Apr. 15, 1902 |
| 1,155,181 | Wilkinson | Sept. 28, 1915 |
| 1,591,415 | Brown | July 6, 1926 |
| 2,401,771 | Nye | June 11, 1946 |
| 2,642,554 | MacCallum | Jan. 23, 1947 |
| 2,570,905 | Young et al. | Oct. 9, 1951 |
| 2,651,747 | Warner | Sept. 8, 1953 |
| 2,667,746 | Kumpf et al. | Feb. 2, 1954 |